United States Patent
Ishibuchi

(10) Patent No.: US 7,952,505 B2
(45) Date of Patent: May 31, 2011

(54) SEMICONDUCTOR DEVICE AND INPUT SELECTION CONTROL METHOD

(75) Inventor: Souichirou Ishibuchi, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 0 days.

(21) Appl. No.: 12/659,231

(22) Filed: Mar. 1, 2010

(65) Prior Publication Data

US 2010/0225516 A1 Sep. 9, 2010

(30) Foreign Application Priority Data

Mar. 2, 2009 (JP) ................. 2009-048594

(51) Int. Cl.
*H03M 1/00* (2006.01)
(52) U.S. Cl. .............. 341/141; 365/189.17; 257/66
(58) Field of Classification Search ......... 341/122–165; 326/83, 86; 365/63, 158, 49.1, 189.17, 154, 365/230.03, 185.05; 711/154; 257/66, 72; 327/78, 89, 108
See application file for complete search history.

(56) References Cited

U.S. PATENT DOCUMENTS

| | | | | |
|---|---|---|---|---|
| 5,699,063 A | * | 12/1997 | Takayama | 341/118 |
| 7,233,176 B2 | * | 6/2007 | Sharma et al. | 327/78 |
| 7,321,329 B2 | * | 1/2008 | Tooyama et al. | 341/163 |
| 7,423,570 B2 | * | 9/2008 | Asayama et al. | 341/144 |
| 7,471,230 B2 | * | 12/2008 | Tooyama et al. | 341/164 |
| 7,855,667 B2 | * | 12/2010 | Tsukamoto | 341/120 |

* cited by examiner

*Primary Examiner* — Lam T Mai
(74) *Attorney, Agent, or Firm* — McGinn IP Law Group, PLLC

(57) ABSTRACT

A semiconductor device includes: input terminals identified by channel numbers and configured to receive analog signals; analog input pads identified by pad numbers and connected with whole or part of the input terminals; a data holding section configured to hold a data of the input terminals; a channel designating section configured to generate a channel designation signal to designate one of the channel numbers; and a channel translating section configured to translate the channel number indicated by the channel designation signal into a specific one of the pad numbers based on the held data. An A/D converting section is configured to convert the analog signal inputted from the analog input pad corresponding to the specific pad number into a digital signal.

12 Claims, 9 Drawing Sheets

Fig. 5

| CH | ADSA | | | P=1 | | | | P=0 | | | |
|---|---|---|---|---|---|---|---|---|---|---|---|
| | | | | ADSB | | | PAD | ADSB | | | PAD |
| | 2 | 1 | 0 | 2 | 1 | 0 | | 2 | 1 | 0 | |
| 0 | 0 | 0 | 0 | 0 | 0 | 0 | 0 | 0 | 0 | 0 | 0 |
| 1 | 0 | 0 | 1 | 0 | 0 | 1 | 1 | 0 | 0 | 1 | 1 |
| 2 | 0 | 1 | 0 | 0 | 1 | 0 | 2 | 0 | 1 | 0 | 2 |
| 3 | 0 | 1 | 1 | 0 | 1 | 1 | 3 | 0 | 1 | 1 | 3 |
| 4 | 1 | 0 | 0 | 1 | 1 | 0 | 6 | 1 | 0 | 0 | 4 |
| 5 | 1 | 0 | 1 | 1 | 1 | 1 | 7 | 1 | 0 | 1 | 5 |
| 6 | 1 | 1 | 0 | — | — | — | — | 1 | 1 | 0 | 6 |
| 7 | 1 | 1 | 1 | — | — | — | — | 1 | 1 | 1 | 7 |

PRODUCT 1 (8ch) P=0

PRODUCT 2 (6ch) P=1

US 7,952,505 B2

SEMICONDUCTOR DEVICE AND INPUT SELECTION CONTROL METHOD

INCORPORATION BY REFERENCE

This application claims a priority on convention based on Japanese Patent Application No. 2009-048594. The disclosure thereof is incorporated herein by reference.

TECHNICAL FIELD

The present invention relates to a semiconductor device having an A/D conversion function and an input selection control method.

BACKGROUND ART

A recent semiconductor device is mounted with a CPU (Central Processing Unit) and a memory, and further has an analog-to-digital (A/D) conversion function. Such semiconductor devices are often handled as product groups serialized based on a memory capacity, the number of A/D conversion channels, the number of I/O (input/output) channels, an operation speed, and so on. Moreover, even for similar functions, the semiconductor devices may be sealed in different packages. While a degree of freedom for mounting increases, functional limits may be imposed due to limits imposed on the number of pins depending on different packages.

For example, in a continuous scan operation of an A/D conversion apparatus, an A/D conversion is sequentially performed while analog input channels are counted and switched. When a semiconductor chip has analog input pads arranged continuously, even though the semiconductor chip is optimal to be mounted in a package having the maximum number of pins, it is not necessarily optimal that the semiconductor chip is mounted in a package having the small number of pins. Therefore, in order to design such a semiconductor device to be mounted in different packages, arrangement of input pins should be considered to be adaptive for each of the packages. In the worst case, the continuous scan must be performed by use of discontinuous channel numbers. In this case, a large load is imposed on development of a control program.

At this point, even if input pads and input pins are connected by bonding wires so that channel numbers become continuous, assembly failure is highly likely to occur. To avoid this, it could be considered that the analog input pads located close to the input pins of the package are selected as analog input channels to be scanned. However, there is a case that connectable analog input channels cannot be continuously provided, depending on positions of the input pins of the package. In such a case, the analog input channels provided in the package must take discrete channel numbers inevitably. When valid analog input channels take discrete channel numbers, processing of a program in which a scan operation is performed for the A/D conversion becomes complicated as described above. Also, the software could not be used for a different series of products.

Moreover, a lead frame is required to have a special shape to adapt for the shape of the semiconductor chip, which leads to a cost increase.

Japanese Patent Publication (JP 2005-303575A) describes an A/D conversion apparatus which can continuously perform A/D conversion without stop. The A/D conversion apparatus includes a register, a selecting section connected to a plurality of analog input channels to which a plurality of analog signals are supplied, and an A/D converting section. The register holds channel specification data to indicate whether or not each of the plurality of analog signals should be subjected to A/D conversion. The selecting section sequentially selects the analog input channels to be subjected to the A/D conversion based on the channel specification data. The A/D converting section performs A/D conversion on the analog signals on the analog input channels selected by the selecting section, to convert them into digital signals. Consequently, the analog signals with different A/D conversion periods can be converted into the digital signals in appropriate conversion periods. Thus, load of software development for control of the A/D conversion and processing of the conversion results can be reduced.

Moreover, Japanese Patent Publication (JP-A-Heisei 9-297658) discloses an A/D conversion apparatus including a channel selector, an A/D converting section, and a control section. The channel selector selects a plurality of analog signal input terminals, and the A/D converting section converts analog signals supplied from the terminals selected by the channel selector into digital signals. The A/D conversion apparatus has a scan mode at the time of reception of a scan conversion start trigger, and a single mode at the time of reception of a single conversion start trigger, and the control section controls the channel selector to set one of the scan mode and the single mode with priority.

SUMMARY OF THE INVENTION

In an aspect of the present invention, a semiconductor device includes: input terminals identified by channel numbers and configured to receive analog signals; analog input pads identified by pad numbers and connected with whole or part of the input terminals; a data holding section configured to hold a data of the input terminals; a channel designating section configured to generate a channel designation signal to designate one of the channel numbers; and a channel translating section configured to translate the channel number indicated by the channel designation signal into a specific one of the pad numbers based on the held data. An A/D converting section is configured to convert the analog signal inputted from the analog input pad corresponding to the specific pad number into a digital signal.

In another aspect of the present invention, an input selection control method of selecting an analog signal to be subjected to A/D conversion in a semiconductor device is provided. The semiconductor device includes: a plurality of input terminals identified by channel numbers and configured to input analog signals; analog input pad identified by pad numbers and connected with input terminals; a data holding section configured to hold data of the plurality of input terminals; and an A/D converting section configured to convert the analog signal inputted from the analog input pad corresponding to the designated pad number into a digital data. The input selection control method is achieved by generating a channel designation signal which specifies one of the channel numbers which identify the input terminals; by translating the channel number indicated by the channel designation signal into the pad number based on a data related to the input terminal; and by performing A/D conversion on an analog signal inputted from the analog input pad corresponding to the designated pad number to convert into a digital signal.

The present invention can provide a semiconductor device which holds control program usability even when loaded in packages with different numbers of terminals and an input selection control method. Moreover, a degree of freedom for arrangement of analog input pads improves.

BRIEF DESCRIPTION OF THE DRAWINGS

The above and other objects, advantages and features of the present invention will be more apparent from the following description of certain embodiments taken in conjunction with the accompanying drawings, in which:

FIG. 5 is a truth value table showing relation between a channel number, a channel designation signal, and an input terminal selection signal;

DESCRIPTION OF PREFERRED EMBODIMENTS

Hereinafter, a semiconductor device according to the present invention will be described with reference to the attached drawings.

Figure 1:
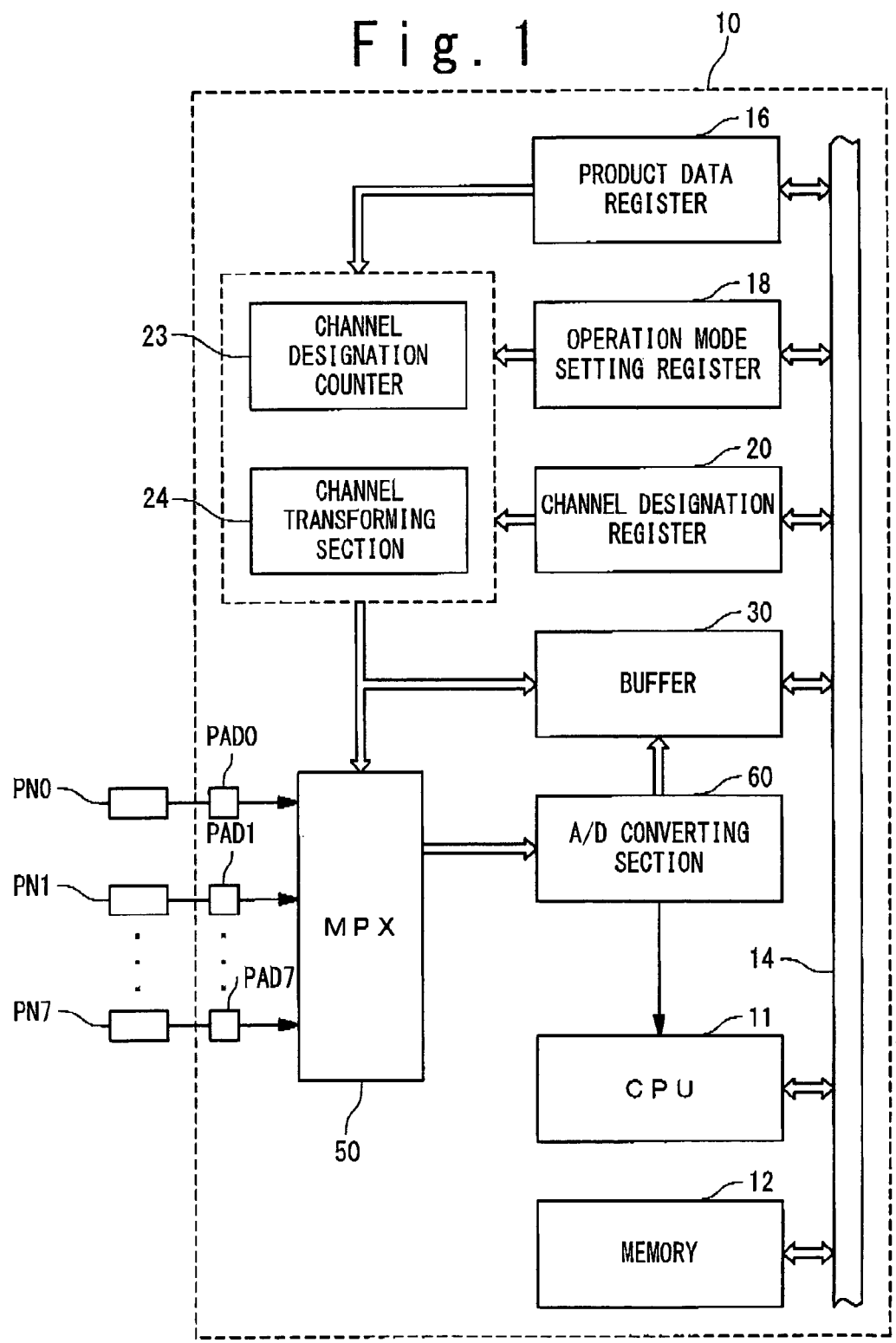
FIG. 1 is a block diagram showing a configuration of a semiconductor device according to an embodiment of the present invention.

FIG. 1 is a block diagram showing a configuration of the semiconductor device according to an embodiment of the present invention. The semiconductor device includes a semiconductor chip 10 having an analog-to-digital (A/D) conversion function, and analog input terminals PN0 to PN7 for receiving analog signals. On the contrary, a different type of package in which the semiconductor chip 10 is mounted includes analog input terminals PN0 to PN5. The number of terminals for inputting and outputting signals from and to an external unit and their arrangement positions are defined for every package. In addition to the terminals described above, the package has the large number of terminals such as power supply terminals, input and output terminals, and so on, although they are omitted since they are not directly related to the present invention. Here, the first package having eight analog input terminals PN0 to PN7, and the second package having six analog input terminals PN0 to PN5 are assumed. The analog input terminals PN0 to PN7 or PN5 are respectively assigned to channel numbers CH0 to CH7 or CH5 in the A/D conversion function. Therefore, the analog input terminals PN0 to PN7 or PN5 can be identified based on the channel numbers.

The semiconductor chip 10 is a microcontroller including a CPU 11 and a memory 12, and acquires data in analog signals by controlling an analog input section via an internal bus 14. The analog input section includes a product data register 16, an operation mode setting register 18, a channel designation register 20, and a result storage buffer 30, all of which are connected to the internal bus 14. A program loaded from a recording medium and executed by the CPU 11 is stored in the memory 12. Moreover, the memory 12 may store data to be processed or data indicating processing results. The CPU 11 accesses these registers and the buffer to control the analog input section.

The semiconductor chip 10 includes a device data storage section (not shown) which stores data related to individual specifications of series of products. When the semiconductor device has been manufactured, the data related to the specification of the semiconductor device, that is, a data for identifying the product is written into the device data storage section. For example, the data may be a number indicating the product. Immediately after a power is turned on or before a user program is executed immediately after resetting, the CPU 11 sets a data of a package mounted with the semiconductor chip 10 from the device data storage section to the product data register 16. Thus, the semiconductor chip 10 is customized in accordance with the specification of the series of products. It should be noted that the analog input terminals PN0 to PN7 are shown as a state of a product 1, but the analog input terminals PN0 to PN5 are shown as a state of a product 2. Moreover, setting of the data to the product data register 16 may be made directly in hardware without passing through the CPU 11.

Figure 2:
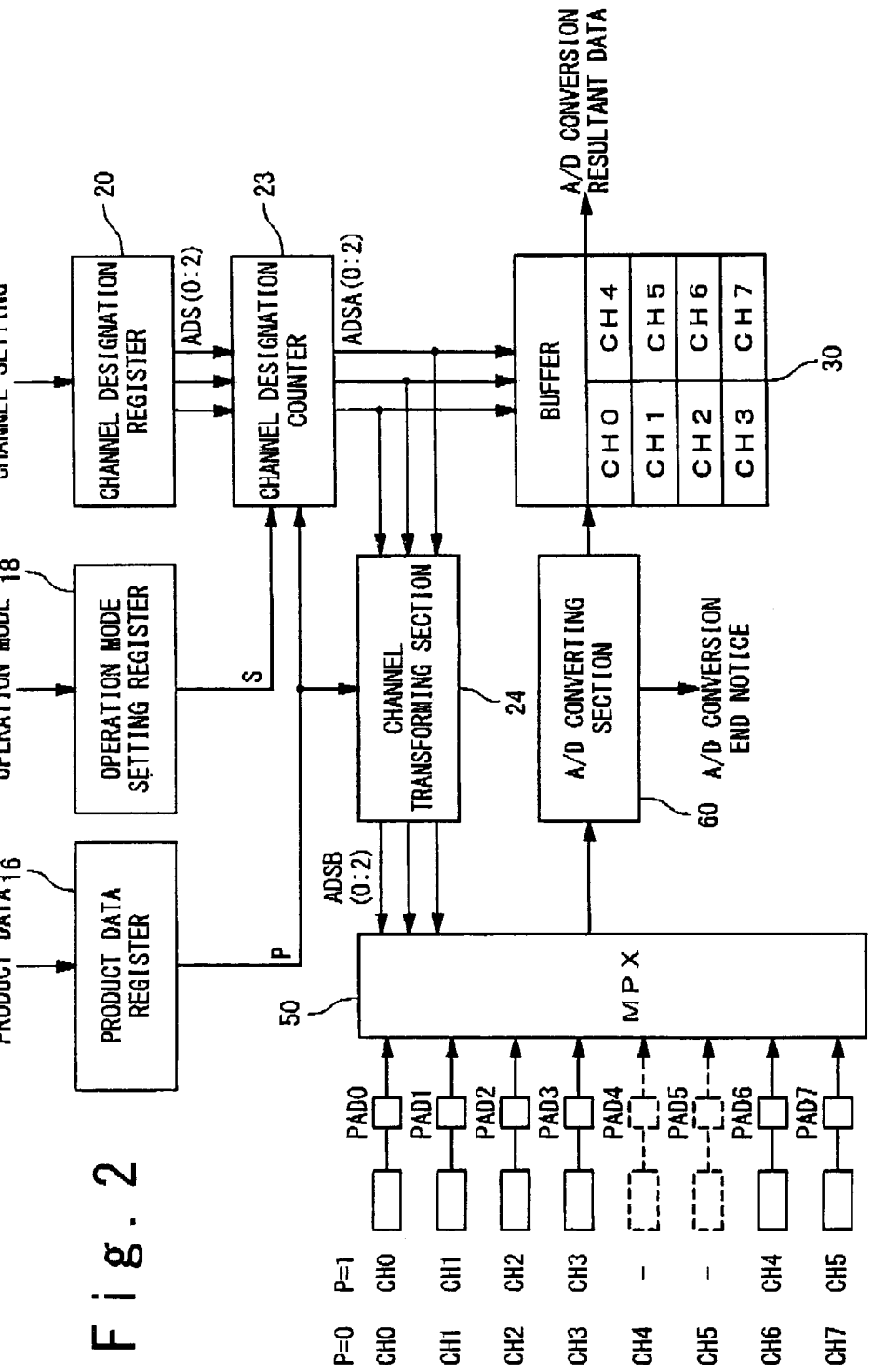
FIG. 2 is a block diagram showing a configuration of an analog input section in the semiconductor device according to the embodiment of the present invention.

FIG. 2 is a block diagram showing a configuration of the analog input section. The analog input section includes a channel designation counter 23, a channel transforming section 24, an analog input selecting section 50, and an A/D converting section 60, in addition to the product data register 16, the operation mode setting register 18, the channel designation register 20, and the result storage buffer 30.

The analog input terminals PN0 to PN7 are connected with analog input pads PAD0 to PAD7 on the semiconductor chip 10 by bonding wires, and analog signals are supplied from the analog input terminals PN0 to PN7 to the analog input selecting section 50 through the analog input pads PAD0 to PAD7. The analog input selecting section 50 selects one of the supplied analog signals based on an input terminal selection signal ADSB supplied from the channel transforming section 24, and supplies the selected analog signal to the A/D converting section 60. The A/D converting section 60 converts the analog signal into a digital signal and stores the digital signal into the result storage buffer 30 as digital data. The result storage buffer 30 determines a position where A/D conversion result data is to be stored, based on a channel designation signal ADSA outputted from the channel designation counter 23. The CPU 11 read the data stored in the result storage buffer 30 through the internal bus 14 based on the program stored in the memory 12, and performs data processing on this.

The product data register 16 holds a data for identifying a product mounted with the semiconductor chip 10. By identifying the product, the individual specification of the series of products can be specified, and as a result of this, the number of analog input terminals and so on can be recognized. The data held in the product data register 16 is supplied to the channel designation counter 23 and the channel transforming section 24 as a product data signal P.

The operation mode setting register 18 holds a data for setting a mode of A/D conversion operation. For the A/D conversion operation; there are a continuous scan operation mode in which the A/D conversion is performed on signals on continuous channels so as to scan them; and a single channel operation mode in which the A/D conversion is performed on a signal on a designated channel. The data held in the operation mode setting register 18 is supplied to the channel designation counter 23 as an operation mode signal S.

The channel designation register 20 designates an input channel for the A/D conversion. A channel number set in the channel designation register 20 is supplied to the channel designation counter 23 as an input channel selection signal ADS. Here, the number of input channels is eight (CH0 to CH7) at a maximum, and the input channel can be designated in three bits. Therefore, the input channel selection signal ADS has three signal lines ADS0, ADS1, and ADS2.

The channel designation counter 23 generates the channel designation signal ADSA that designates the input channel in the operation mode indicated by the operation mode signal S. In a case of the continuous scan operation mode, continuous channel numbers are generated in synchronization with an A/D conversion clock signal ADCLK that activates the A/D conversion. At this point, upon exceeding the largest channel number, control is performed so as to return to a smallest channel number (0) based on the product data signal P. In a case of the single channel operation mode, the channel designation signal ADSA is generated based on the channel number designated by the channel designation register 20. The channel designation signal ADSA is supplied to the channel transforming section 24 and the result storage buffer 30. Like the input channel selection signal ADS, the channel designation signal ADSA has three signal lines ADSA0, ADSA1, and ADSA2.

The channel transforming section 24 generates the input terminal selection signal ADSB from the channel designation signal ADSA based on the product data signal P, to select the analog input pad PAD. Specifically, the channel transforming section 24 translates the channel number indicated by the channel designation signal ADSA into a number indicating the analog input pad PAD connected to the analog input terminal identified by the channel number to generate the input terminal selection signal ADSB. The translation result depends on the product data signal P, and the translation for the eight channels and the translation for the six channels are selectively performed in this example. The generated input terminal selection signal ADSB is supplied to the analog input selecting section 50. This input terminal selection signal ADSB similarly has three signal lines ADSB0, ADSB1, and ADSB2.

The analog input selecting section 50 selects an analog signal to be supplied to one of the analog input pads PAD0 to PAD 7 which is indicated by the input terminal selection signal ADSB, and outputs the selected analog signal to the A/D converting section 60. The A/D converting section 60 converts the analog signal into a digital signal in synchronization with the A/D conversion clock signal ADCLK, and outputs the digital signal to the result storage buffer 30. Upon completion of the A/D conversion, the A/D converting section 60 outputs an A/D conversion completion notice to the CPU 11. In a case of the continuous scan operation mode, the A/D conversion completion notice may be outputted upon completion of A/D conversion of the analog signal on the largest channel number in this product to thereby reduce a load imposed on the CPU 11.

The result storage buffer 30 stores the digital signal outputted from the A/D converting section 60 in the form of a digital data in a predetermined location indicated by the channel designation signal ADSA. During the operation in the continuous scan operation mode, the channel designation signal ADSA is sequentially switched, so that the digital data is continuously stored into the result storage buffer 30. In other words, the channel designation signal ADSA indicates an address of the result storage buffer 30. The digital data stored in the result storage buffer 30 is processed by the CPU 11.

FIG. 2 shows the semiconductor device when the semiconductor chip 10 is mounted in the first package having the eight analog input terminals PN0 to PN7, including portions indicated by broken lines. Also, the semiconductor device is shown when the semiconductor chip 10 is mounted in the second package having the six analog input terminals PN0 to PN5, excluding the portions indicated by the broken lines. Here, when the semiconductor chip 10 is mounted in the first package having the analog input terminals PN0 to PN7, "0" is stored into the product data register 16. At this time, the product data signal P indicates "0". When the semiconductor chip 10 is mounted in the second package having the analog input terminals PN0 to PN5, "1" is stored into the product data register 16. At this time, the product data signal P indicates "1".

As shown in FIG. 2, when the product data signal P is "0" or "1", the analog signals on the analog channels CH0 to CH3 are supplied from the analog input terminals PN0 to PN3 to the analog input selecting section 50 through the analog input pads PAD0 to PAD3. The analog signals on the analog channels CH4 and CH5 are supplied to the analog input selecting section 50 through the analog input pads PAD4 and PAD5 when the product data signal P is "0". The analog signals on the analog channels CH4 and CH5 are supplied to the analog input selecting section 50 through the analog input pads PAD6 and PAD7 when the product data signal P is "1". The analog signals on the analog channels CH6 and CH7 are supplied only when the product data signal P is "0". In this manner, bonding wires can be varied for every product based on the package and arrangement positions of the input terminals, and thus connection relation is different between the first package and the second package. Moreover, the number of analog input channels also varies.

Figure 3:
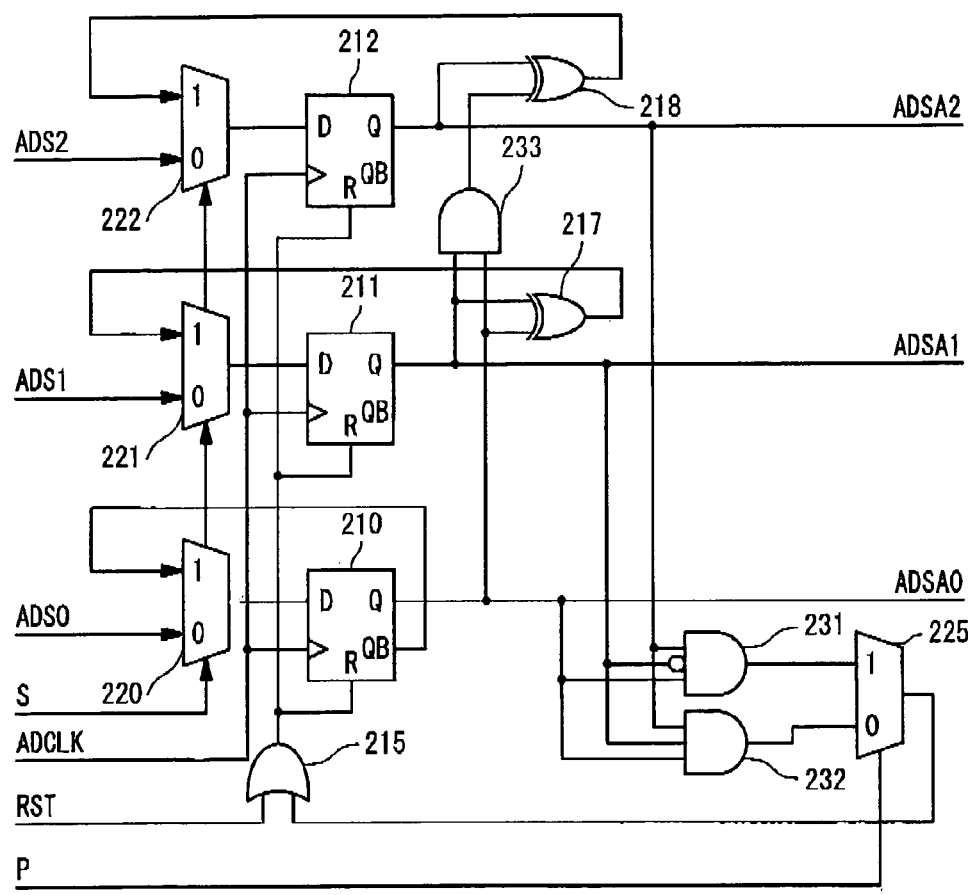
FIG. 3 is a diagram showing a configuration of a channel designation counter in the semiconductor device according to the embodiment of the present invention.

FIG. 3 is a block diagram showing a configuration of the channel designation counter 23. The channel designation counter 23 includes D flip-flops 210 to 212, selectors 220 to 222 and 225, AND circuits 231 to 233, an OR circuit 215, and EX-OR circuits 217 to 218. In the case of the continuous scan operation mode, since the largest channel number varies depending on the package and soon, the channel designation counter 23 changes its operation based on the product data signal P. A portion excluding the AND circuits 231 and 232 and the selector 225 is an ordinary synchronization type counter that counts clocks of the A/D conversion clock signal ADCLK. The AND circuit 231 counts "5", and the AND circuit 232 detects "7". The selector 225 selects a detection signal of the count of "5" or the count of "7" based on the product data signal P, and supplies the selected detection signal as a reset signal to the D flip-flops 210 to 212 through the OR circuit 215.

Therefore, in the case of the continuous scan operation mode, when the largest count value defined by the product data signal P has been counted, the D flip-flops 210 to 212 are reset, and the counting operation restarts from zero. The selectors 220 to 222 are controlled by the operation mode signal S. When the operation mode signal S is "1", the continuous scan operation mode is set and the selectors 220 to 222 give a next count value to the D flip-flops 210 to 212 based on the current count value. When the operation mode signal S is "0", the single channel operation mode is set and the selectors 220 to 222 give a channel number indicated by the input channel selection signal ADS outputted from the channel designation register 20 to the D flip-flops 210 to 212.

In this case, the channel designation signal ADSA indicates the same channel number as the input channel selection signal ADS.

Figure 4:
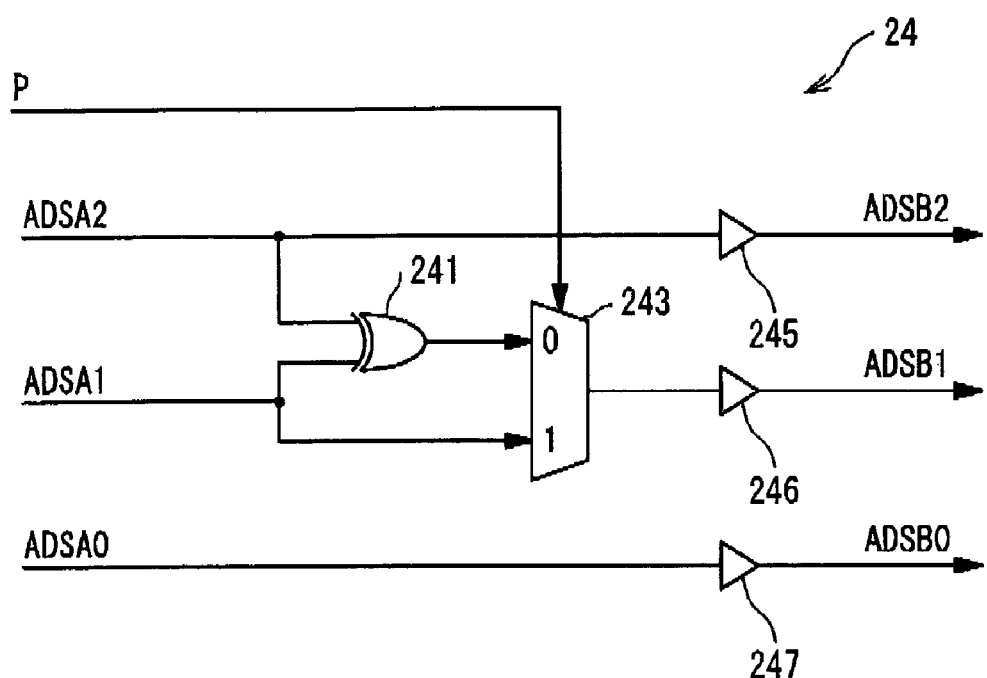
FIG. 4 is a diagram showing a configuration of a channel converting section in the semiconductor device according to the embodiment of the present invention.

The channel transforming section 24 includes a selector 243, an EX-OR circuit 241, and buffer circuits 245 to 247, as shown in FIG. 4, and translates the channel designation signal ADSA into the input terminal selection signal ADSB based on the product data signal P. The translation from the channel designation signal ADSA to the input terminal selection signal ADSB is indicated by a truth value table switched based on the product data signal P, as shown in FIG. 5. This truth value table is realized by a logic circuit shown in FIG. 4. The channel transforming section 24 can be realized by such a logic circuit, but it may be realized by a table using a memory. This is effective especially when translation logic is complicated.

Figure 6A:
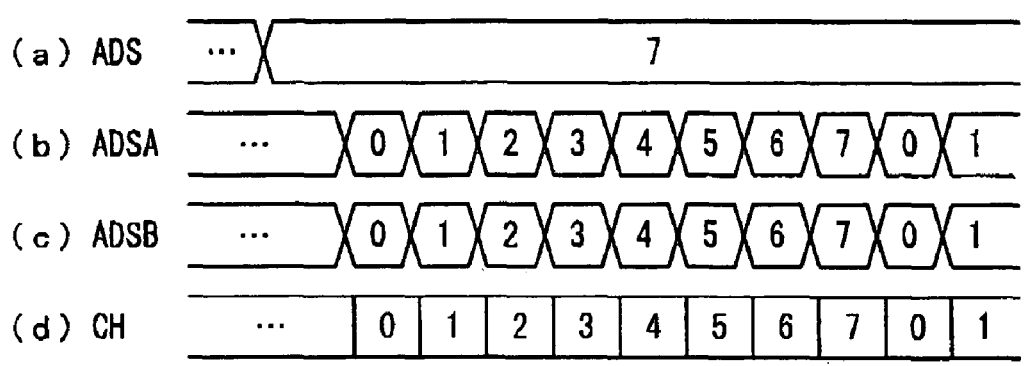
FIG. 6A shows timing charts of signals when a production data signal P is "0"

FIG. 6A shows timing charts of the signals, in a case of the product data signal P of "0", that is, when the analog input terminals PN0 to PN7 are validated. At this time, the largest channel number of "7" can be set in the channel designation register 20, and the input channel selection signal ADS indicates "7", as shown in (a) of FIG. 6A. In the continuous scan operation mode (S=1), the channel designation counter 23 counts the clocks, and as shown in (b) of FIG. 6A, the channel designation signal ADSA repeatedly indicates "0" to "7".

The channel transforming section 24 translates the channel designation signal ADSA into the input terminal selection signal ADSB that repeats "0" to "7", as shown in (c) of FIG. 6A. Here, when P=1, all the analog input pads PAD0 to PAD7 are connected to the analog input terminals PN0 to PN7. Thus, the number indicated by the channel designation signal ADSA and the number indicated by the input terminal selection signal ADSB are equal to each other. Therefore, the analog signal of the analog channel CH0 to CH7 supplied to the analog input terminal PN0 to PN7 is inputted through the analog input pad PAD0 to PAD7 designated by the input terminal selection signal ADSB ((d) of FIG. 6A). The digital data is stored in a location corresponding to channel number in the result storage buffer 30.

Figure 6B:
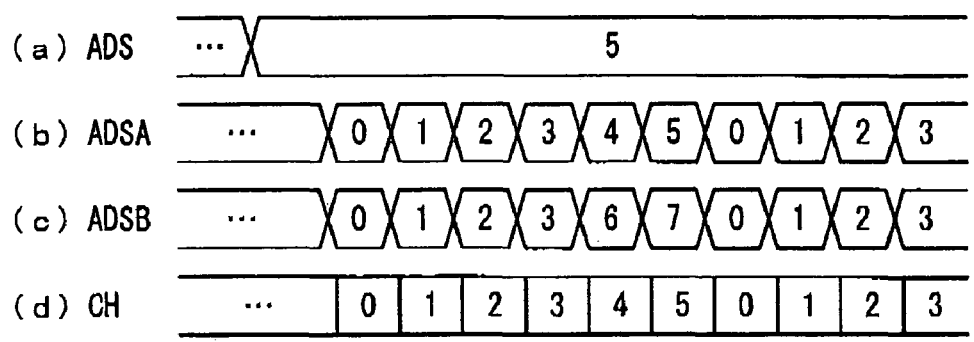
FIG. 6B shows timing charts of the signals when the production data signal P is "1"

FIG. 6B shows timing charts of the signals, in the case of the product data signal P of "1", that is, when the analog input terminals PN0 to PN5 are validated. At this time, the largest channel number of "5" can be designated in the channel designation register 20, and the input channel selection signal ADS indicates "5", as shown in (a) of FIG. 6B. In the continuous scan operation mode (S1), the channel designation counter 23 counts the clocks, and as shown in (b) of FIG. 6B, the channel designation signal ADSA repeatedly indicates "0" to "5".

The channel transforming section 24 translates the channel designation signal ADSA into the input terminal selection signal ADSB that repeats "0" to "3" and "6" to "7", as shown in (c) of FIG. 6B. Here, when P=1, the analog input pads PAD4 and PAD5 are not connected to the analog input terminals. Thus, the number indicated by the channel designation signal ADSA and the number indicated by the input terminal selection signal ADSB are sometimes different from each other. Therefore, the analog signals of the analog channels CH0 to CH5 inputted to the analog input terminals PN0 to PN5 are inputted through the analog input pads PAD0 to PAD3 and PAD 6 to PAD 7 designated by the input terminal selection signal ADSB ((d) of FIG. 6B). The digital data is stored in a location corresponding to the channel number in the result storage buffer 30.

Figure 7A:
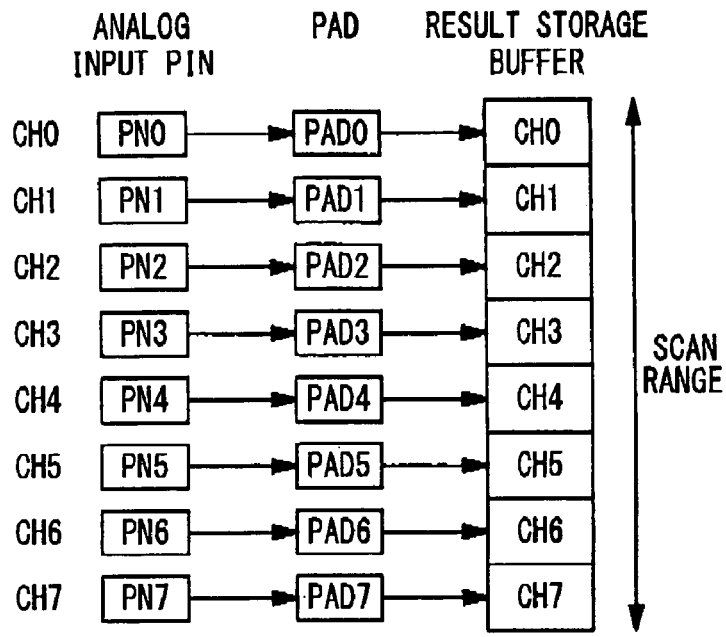
FIGS. 7A and 7B are diagrams illustrating correspondence relation between input signals, analog input terminals, analog input pads, and a result storage buffer.

Therefore, as shown in FIG. 7A, for the product 1, the analog input terminals PN0 to PN7 correspond to analog inputs of the eight channels and the analog signals are inputted through the analog input pads PAD0 to PAD7 connected to the analog input terminals PN0 to PN7. The inputted analog signals are subjected to A/D conversion, and the digital data indicating results of the A/D conversion are stored into the result storage buffer 30 in order of the channel numbers (CH0 to CH7). In the continuous scan operation mode, the signals of all the channels are subjected to scanning in the order of the channel numbers.

Figure 7B:
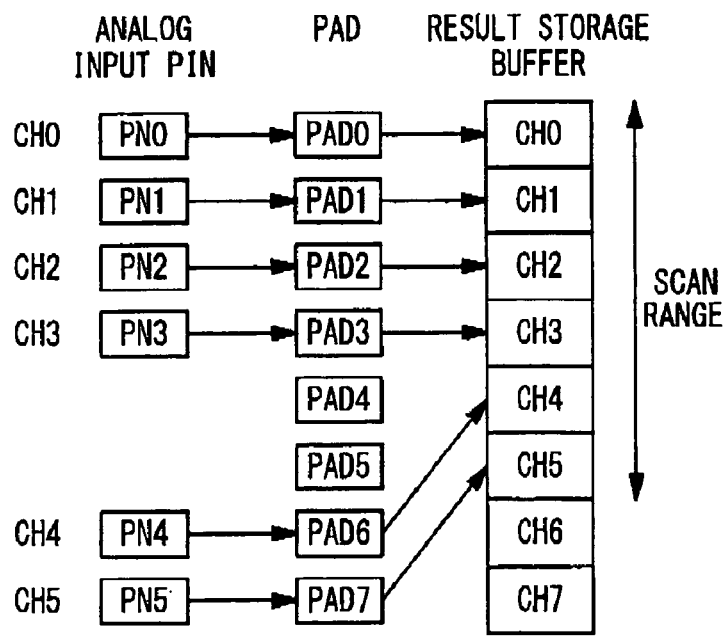

On the other hand, as shown in FIG. 7B, for the product 2 having analog inputs of the six channels, the analog input terminals PN0 to PN5 correspond to the analog inputs of the six channels, and the analog signals are inputted through the analog input pads PAD0 to PAD3 and PAD6 and PAD7 which are respectively connected to the analog input terminals PN0 to PN5. The analog input pads PAD4 and PAD5 are unused pads. The inputted analog signals are subjected to A/D conversion, and the digital data indicating results of the A/D conversion are stored into the result storage buffer 30 in order of the channel numbers (CH0 to CH5). In the continuous scan operation mode, the signals of the continuous six channels are subjected to scanning in this order of the channel numbers.

As described above, in the present invention, correspondence relation between the analog input terminals PN0 to PN7 on the first package and the analog input pads PAD0 to PAD7 on the semiconductor chip is set in the channel transforming section 24 based on the data set in the product data register 16. Therefore, even if pin arrangement differs from one product to another, so that the order of the analog input pads PAD0 to PAD7 and the order of the analog input terminals PN0 to PN7 do not coincide with each other, a continuous scan operation can be performed by use of continuous channel numbers. That is, which of the analog input terminals each of the analog input pads is connected needs not to be recognized on the side of the program executed by the CPU 11.

Therefore, even when semiconductor chips with the same circuit configuration are mounted in a plurality of packages with different numbers of terminals (numbers of pins), analog input channels to be scanned for the A/D conversion need not to be specified in a discrete manner. Thus, complication of a software program can be prevented and applicability of the software program can be widened. Moreover, a degree of freedom for input pad arrangement increases in semiconductor chip designing, without reducing package assembling performance due to deviation of the analog input terminals and the input pads.

It should be noted that in the embodiment, the number of analog input pads is eight, the number of analog input pins selected depending on the product is eight or six, and each of the input channel selection signal ADS, the channel designation signal ADSA, and the input terminal selection signal ADSB is transferred on the three signal lines. However, it would be obvious that the present invention can be realized in the same manner even when the number of analog input pads n is increased or decreased. Moreover, the description is focused on the continuous scan operation mode in this example, but the A/D conversion can be performed in a single channel and at arbitrary timing. Further, in the continuous scan operation mode, the start input channel is not limited to the channel CH0, and thus a function may be provided in which a range from an arbitrary input channel of the analog input pins in each package to another arbitrary input channel thereof can be selected. Furthermore, the channel translation with the different numbers of input terminals has been described above, but translation may be performed for switching positions of the analog input terminals and the analog input pads.

Figure 8:
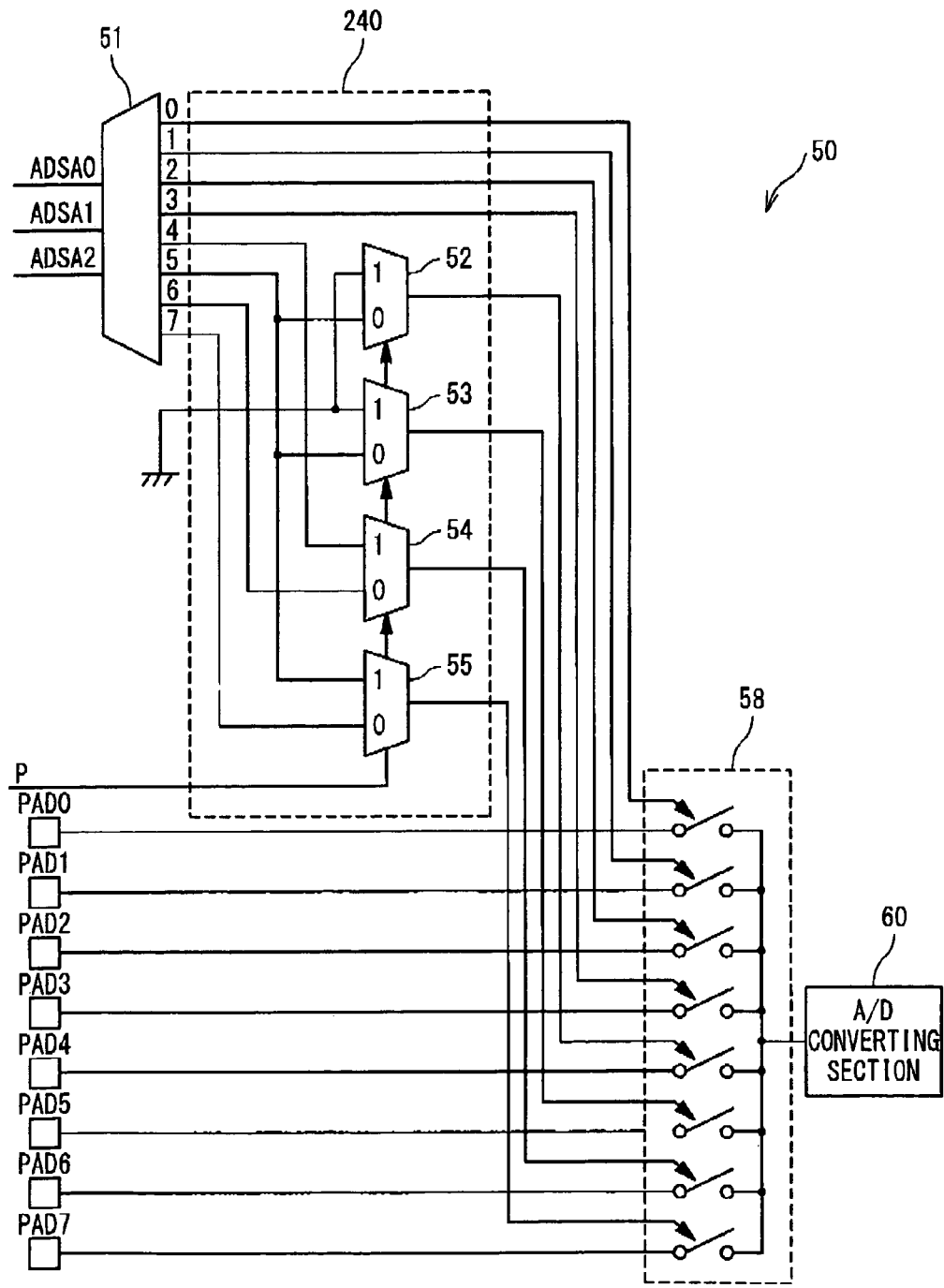
FIG. 8 is a diagram showing configuration of an analog input selecting section having a channel transforming section.

Moreover, as described above, the channel translation is performed on the channel designation signal ADSA, but the channel translation may be performed in the analog input selecting section 50 as described in FIG. 8. Here, the analog input selecting section 50 includes a decoder 51, a switch 58, and a channel transforming section 240 including selectors 52 to 55.

The decoder 51 is activated for every channel based on the channel designation signal ADSA outputted from the channel designation counter 23, and outputs a signal specifying the input channel. The channel transforming section 240 translates the specifying signal for every channel based on the product data signal P, to supply to the switch 58. The switch 58 closes a switch at a specified position, and supplies to the A/D converting section 60, a specified input signal of the signals inputted to the analog input pads PAD0 to PAD7.

The timing charts of the A/D conversion operation in this case are shown in FIGS. 6A and 6B and are the same as those described above. Therefore, the description is omitted. Moreover, correspondence relation between the analog input terminals PN0 to PN7, the analog input pads PAD0 to PAD7, and storage positions of the result storage buffer 30 is also the same as that described above, as shown in FIG. 7. Therefore, the description is omitted. A difference lies in that the channel transforming section 240 shown in FIG. 8 translates the channel designation signal after decoding while the channel transforming section 24 translates it before decoding. Consequently, at a semiconductor chip designing stage, when it is possible to determine a circuit configuration of an I/O section in advance, a control circuit of the A/D conversion apparatus is not complicated. Also, the control circuit of the A/D conversion apparatus could be used even upon development of a different semiconductor chip.

The semiconductor device of the present invention is mounted with an A/D conversion apparatus having a scan function of performing A/D conversion continuously without stopping it while switching the analog input pin for each of the terminals along an array of the analog input pins on the package. Upon mounting the semiconductor chip on a plurality of packages with different numbers of pins, assignment of logical channel numbers of analog input pads arranged on the semiconductor chip can be changed through control in the semiconductor chip so that the analog input pads arranged at an appropriate physical position are selected. Consequently, improvement in workability in assembly of the semiconductor chip in packages with different numbers of pins can be achieved while maintaining high usability of the control program for the A/D conversion apparatus.

What is claimed is:

1. A semiconductor device comprising:
   input terminals identified by channel numbers and configured to receive analog signals;
   analog input pads identified by pad numbers and connected with whole or part of said input terminals;
   a data holding section configured to hold a data of said input terminals;
   a channel designating section configured to generate a channel designation signal to designate one of the channel numbers;
   a channel translating section configured to translate the channel number indicated by the channel designation signal into a specific one of the pad numbers based on the held data; and
   an A/D converting section configured to convert the analog signal inputted from the analog input pad corresponding to the specific pad number into a digital signal.

2. The semiconductor device according to claim 1, wherein the held data is set in said data holding section immediately after power is supplied, or before a user program is executed immediately after reset.

3. The semiconductor device according to claim 1, further comprising:
   an input signal selecting circuit configured to output one, which is selected based on the channel designation signal, of the analog signals inputted from said analog input pads.

4. The semiconductor device according to claim 1, further comprising;
   an input signal selecting circuit which comprises:
   a decoder configured to decode the channel designation signal; and
   a switch circuit configured to output the selected analog signal to said A/D converting section,
   wherein said channel translating section translates an output of said decoder to supply to said switch circuit.

5. The semiconductor device according to claim 1, wherein said channel designating section comprises:
   a channel designation register configured to hold the channel number which is single; and
   a channel designation counter configured to generate continuous channel numbers, and
   wherein said channel designation counter changes a maximum count based on the held data.

6. The semiconductor device according to claim 1, further comprising;
   a result storage buffer configured to store the digital signal outputted from said A/D converting section in a location corresponding to the channel number based on said channel designation signal.

7. The semiconductor device according to claim 1, further comprising;
   a CPU configured to read out a digital data corresponding to the digital signal from said result storage buffer to execute a process.

8. The semiconductor device according to claim 7, wherein said CPU sets the held data in said data holding section.

9. An input selection control method of selecting an analog signal to be subjected to A/D conversion in a semiconductor device which comprises:
   a plurality of input terminals identified by channel numbers and configured to input analog signals;
   analog input pad identified by pad numbers and connected with input terminals;
   a data holding section configured to hold data of said plurality of input terminals; and
   an A/D converting section configured to convert the analog signal inputted from the analog input pad corresponding to the designated pad number into a digital data, said input selection control method comprising:
   generating a channel designation signal which specifies one of the channel numbers which identify the input terminals;
   translating the channel number indicated by the channel designation signal into the pad number based on a data related to the input terminal; and
   performing A/D conversion on an analog signal inputted from the analog input pad corresponding to the designated pad number to convert into a digital signal.

10. The input selection control method according to claim 9, further comprising:
    setting said data to a register immediately after a power is supplied or before a user program is executed immediately after a reset signal becomes active.

11. The input selection control method according to claim 9, further comprising:

selecting one of the analog signals inputted from the analog input pads based on the channel designation signal to supply to said A/D converting section.

12. The input select control method according to claim 9, further comprising;

storing said digital data in the location corresponding to the channel number of the result storage buffer based on the channel designation signal.

* * * * *